(12) United States Patent
Clark

(10) Patent No.: US 7,151,770 B1
(45) Date of Patent: Dec. 19, 2006

(54) COMMUNICATIONS NETWORK

(75) Inventor: Jonathan Andrew Clark, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/830,460

(22) PCT Filed: Nov. 17, 1999

(86) PCT No.: PCT/GB99/03826

§ 371 (c)(1),
(2), (4) Date: Apr. 27, 2001

(87) PCT Pub. No.: WO00/33605

PCT Pub. Date: Jun. 8, 2000

(30) Foreign Application Priority Data

Nov. 27, 1998 (EP) .................................. 98309757

(51) Int. Cl.
*H04L 12/28* (2006.01)

(52) U.S. Cl. .................. 370/352; 370/392; 370/395.1; 370/401

(58) Field of Classification Search ........ 370/351–358, 370/389, 392, 395.1, 396, 397, 400, 401, 370/409

See application file for complete search history.

(56) References Cited

U.S. PATENT DOCUMENTS

| 5,727,002 A | 3/1998 | Miller et al. |
| 5,732,078 A | 3/1998 | Arango |
| 6,157,636 A * | 12/2000 | Voit et al. .................... 370/353 |
| 6,327,267 B1 * | 12/2001 | Valentine et al. ........... 370/466 |
| 6,327,358 B1 * | 12/2001 | March et al. .......... 379/221.01 |
| 6,385,193 B1 * | 5/2002 | Civanlar et al. ............ 370/352 |
| 6,426,955 B1 * | 7/2002 | Gossett Dalton et al. ... 370/401 |
| 6,459,783 B1 * | 10/2002 | March et al. .......... 379/211.02 |
| 6,687,360 B1 * | 2/2004 | Kung et al. ............ 379/211.02 |
| 6,754,180 B1 * | 6/2004 | Christie ...................... 370/236 |
| 6,754,181 B1 * | 6/2004 | Elliott et al. ................. 370/252 |
| 2002/0024945 A1 * | 2/2002 | Civanlar et al. ............ 370/352 |
| 2002/0136244 A1 * | 9/2002 | Miki et al. .................. 370/535 |

OTHER PUBLICATIONS

Schrodi et al, "Integration of IP Packet Fowarding in an ATM Switch" ISS '97, World Telecommunications Congress (International Swtiching Symposium), Global Network Evolution: Convergence or Collision? Toronto, Sep. 21-26, 1997, vol. 1, Sep. 21, 1997, pp. 247-254, XP000720530.

* cited by examiner

*Primary Examiner*—Huy D. Vu
*Assistant Examiner*—Roberta A. Shand
(74) *Attorney, Agent, or Firm*—Nixon & Vanderhye P.C.

(57) ABSTRACT

A communication system includes a packet-switched network and a circuit-switched network. Gateways on the circuit-switched network adapt packet traffic for transmission on the circuit-switched network. The end-point of the switched virtual circuit is chosen by transmitting polling messages from the gateways to the destination address of the packet and selecting a gateway depending on the delay in the response to the respective polling message.

10 Claims, 13 Drawing Sheets

COMMUNICATIONS NETWORK

BACKGROUND

1. Technical Field

The present invention relates to a communications network and in particular to a network in which packets are routed on circuits established in a circuit-switched network.

2. Related Art

Conventionally, networks using packet-based protocols such as internet protocol (IP) have functioned on a best-effort basis. As a result, quality of service, as measured by such parameters as packet loss and latency, has varied considerably depending on the loading of network resources such as routers. While such variation is acceptable for some applications, such as Email, it is potentially a barrier to the use of internet protocol for more critical applications such as voice telephony or multimedia conferencing. Accordingly, considerable effort has been addressed to developing guaranteed quality of service mechanisms for internet protocol traffic. One approach is to convert IP traffic for transmission via a circuit-switched network, such as an ATM (asynchronous transfer mode) network and to rely upon the QoS mechanisms inherent in such a network. One example of this approach is the architecture proposed by the ATM Forum and known as MPOA (multi-protocol over ATM). This is described in the specification published by the ATM Forum Technical Committee, "Multi-Protocol Over ATM Version 1.0" AF-MPOA-0087.000, July 1997. This type of approach suffers a number of disadvantages. In particular, it tends to achieve efficient routing only when the end-point of a particular connection lies on the circuit-switched network. Moreover this approach tends to function optimally only within the bounds of single network domain having a common control and management system.

SUMMARY

According to a first aspect of the present invention, there is provided a method of operating a communications system comprising
a packet-switched network, a circuit-switched network, a plurality of gateways connecting the circuit-switched network to the packet-switched network, the method comprising;
 a) receiving packet traffic at one of the gateways;
 b) establishing in the circuit-switched network a circuit from the gateway to a node on the circuit-switched network; and
 c) outputting the said packet traffic from the gateway onto the circuit; characterised by
 d) outputting from a plurality of gateways polling messages addressed to the destination address of the packet traffic;
 e) receiving at the gateways replies from the destination address;
 f) determining the respective delays for the replies at the different respective gateways;
 g) selecting one of the gateways depending on the respective delay times;
 h) establishing the circuit to the node selected in step (g).

The exemplary embodiment of this invention provides a communications system which maximizes the benefits to be obtained by the use of "cut-throughs" for packet traffic on a circuit-switched network, even when the ultimate destination of the packets does not itself lie on the circuit-switched network. This is achieved by sending polling messages, such as Ping messages as defined for packet networks using Internet Protocol, from gateways on the circuit-switched network into the packet-switched network. The optimum destination point on the circuit-switched network for the cut-through can then be selected dynamically to give the best path to the destination packet address.

The invention provides a communications system which maximises the benefits to be obtained by the use of "cut-throughs" for packet traffic on a circuit-switched network, even when the ultimate destination of the packets does not itself lie on the circuit-switched network. This is achieved by sending polling messages, such as Ping messages as defined for packet networks using Internet Protocol, from gateways on the circuit-switched network into the packet-switched network. The optimum destination point on the circuit-switched network for the cut-through can then be selected dynamically to give the best path to the destination packet address.

A further important advantage of the present exemplary embodiment is that it enables circuits to be established across different networks. By contrast, in an MPOA architecture, an SVC cut-through is limited to the extent of the MPOA network.

Preferably the circuit-switched network includes a plurality of independently controlled networks and different ones of the plurality of gateway platforms are connected to different respective ones of the plurality of networks.

A further important advantage of the present invention is that it enables circuits to be established across different networks. By contrast, in an MPOA architecture, an SVC cut-through is limited to the extent of the MPOA network Preferably the steps of selecting one of the gateways is carried out by a control node, and one or more of the gateways communicate a respective delay time to the control node. Preferably one or more of the gateways communicate a respective delay time to a control node and the step of selecting one of the gateways is carried out by the control node. The control node may be one of the gateways, or it may be a separate platform, remote from the gateways.

In a preferred implementation a control node, such as the gatekeeper described below, communicates with the gateways. By communicating a threshold delay to the nodes, and only returning delay values to the control node when the delay is less than the threshold, the processing and signalling overheads for determining the appropriate destination gateway are further minimised.

The invention also encompasses control nodes, gateways and networks incorporating such control nodes and gateways.

BRIEF DESCRIPTION OF THE DRAWINGS

Systems embodying the present invention will now be described in futher detail, by way of example only, with reference to the accompanying drawings, in which.

DETAILED DESCRIPTION OF EXEMPLARY EMBODIMENTS

Figure 1:
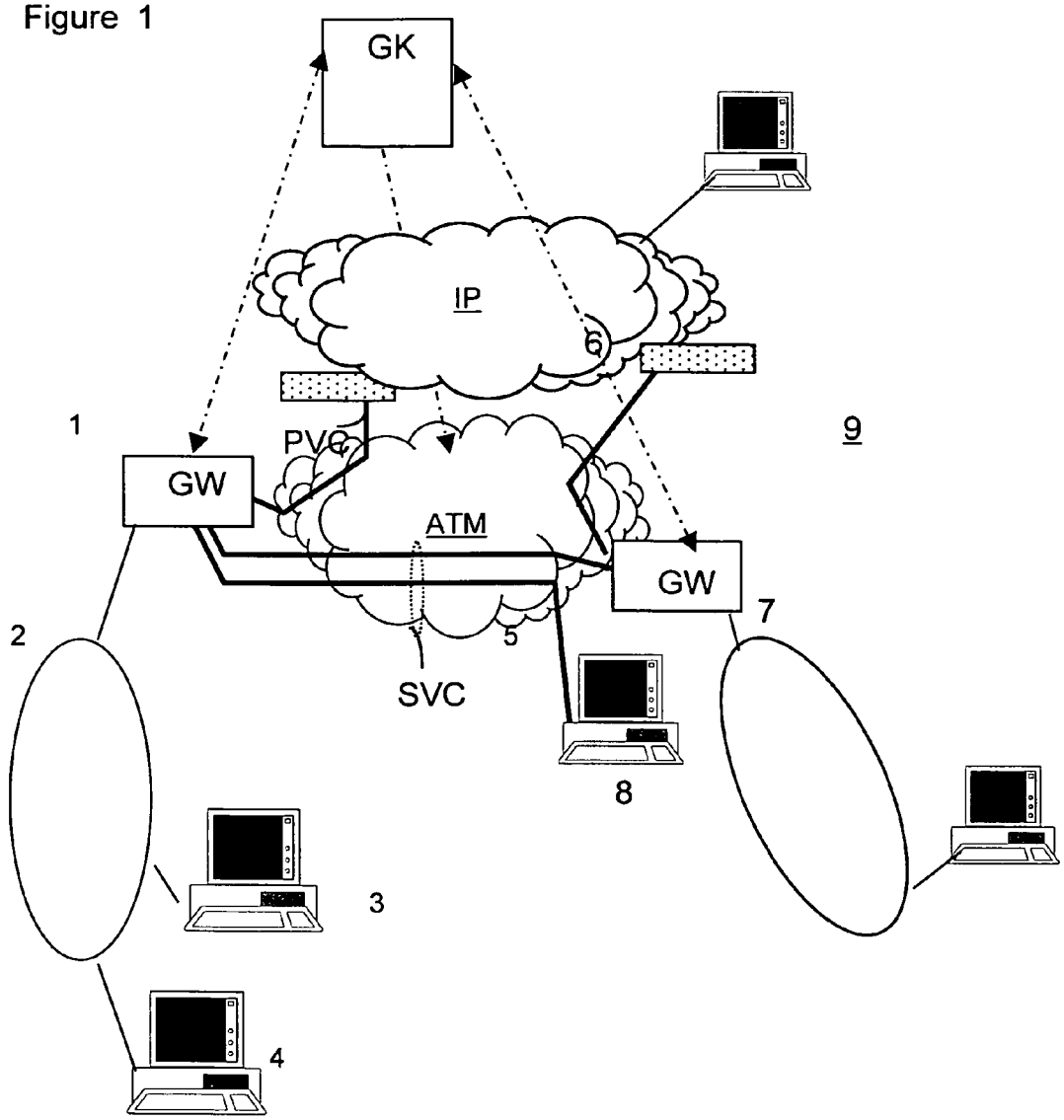
FIG. 1 is a schematic of a communications system embodying the invention.

A communications system includes a gateway 1 which is connected via a network 2 to a number of customer terminals 3,4. In this example, the network 2 is an ethernet LAN, and the customer terminals generate traffic comprising Internet Protocol (IP) packets. The gateway 1 is connected to an ATM (asynchronous transfer mode) network which provides circuit-switched connections to an IP router 6, to one or more further gateways 7, and to ATM terminals 8. The IP router is connected in turn to the internet 9. The gateway 1 is also connected via the ATM network to a gatekeeper platfrom. The gatekeeper in combination with the gateway constitutes a control platform which controls the establishing of circuits through the ATM network that route traffic so as to provide required QoS levels, as will be further described below.

Figure 2:
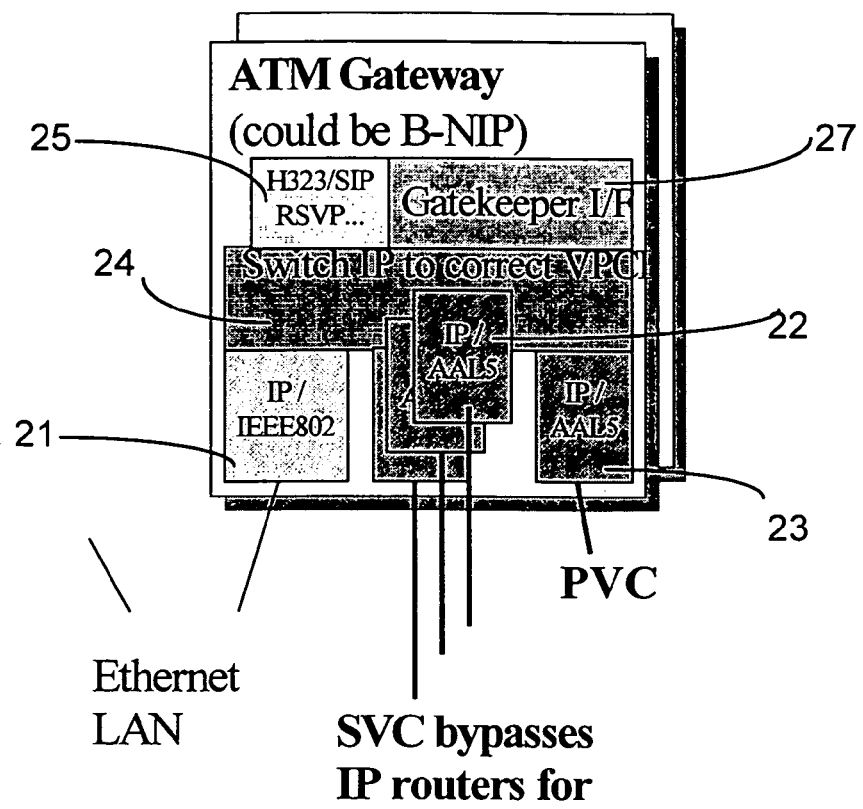
FIG. 2 is a diagram showing a gateway platform for use in the system of FIG. 1.

FIG. 2 shows the gateway 1 in further detail. The gateway includes an Ethernet interface 21 which communicates IP packets with the network 2. It also includes a first group of ATM ports 22 which are connected to switched virtual circuits (SVC's) in the ATM network 5. A further ATM port 23 is connected to a permanent virtual circuit (PVC) which connects the gateway via the ATM network 5 to the IP router 6, and via the IP router to an IP network. An ATM adaption layer (AAL5) associated with the ATM ports 22,23 converts IP data to the format required for transmission on the ATM network. The flow of traffic through the ports is controlled by a switching module 24. The switching module 24 is in turn controlled by inputs from QoS module 25 and from a gatekeeper interface 26. The QoS module may be programmed to respond to a number of standard IP-related QoS protocols including, in this example, RSVP (resource reservation protocol), SIP (session initiation protocol) and H323. In addition, the QoS module 25 may include a proprietary interface to allow direct requests for QoS levels to be transmitted from, e.g, one of the terminals on the network 2.

Figure 3:
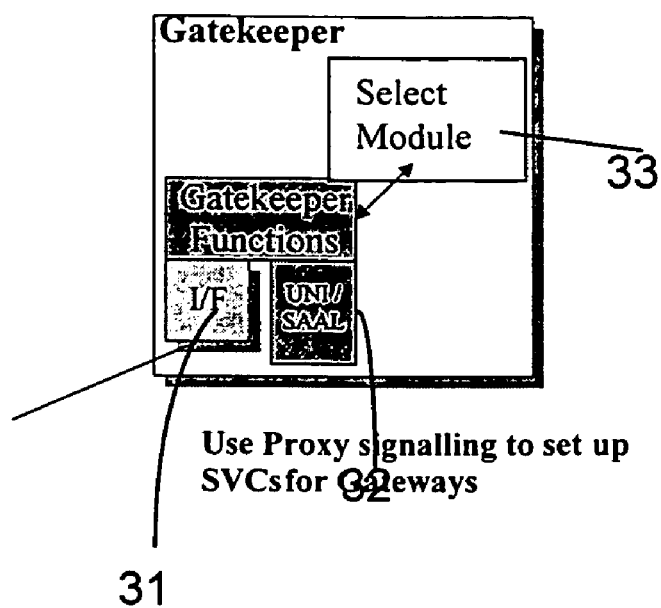
FIG. 3 is a diagram showing a gatekeeper platform for use in the system of FIG. 1.

FIG. 3 shows the structure of the gatekeeper. Although it may alternatively be integrated with one of the gateways, in this preferred implementation the gatekeeper is a separate platform at a location remote from the gatekeepers. It includes an interface 31 for communication with each of the gateways, and a UNI/SAAL (User-to-Network Interface/Signalling ATM Adaption Layer) interface 32 to the ATM network. This interface 32 to the ATM network is used to output control signals to ATM routers and other entities in the network in order, for example to set up a switched virtual circuit SVC. A gatekeeper control module 33 responds to signalling on the interfaces 31,32. The control module 33 is linked to an egress point selection module. As will be described in further detail below, the egress point selection module cooperates with the gateways to find and select an appropriate end-point for the switched virtual circuit.

Figure 4I:
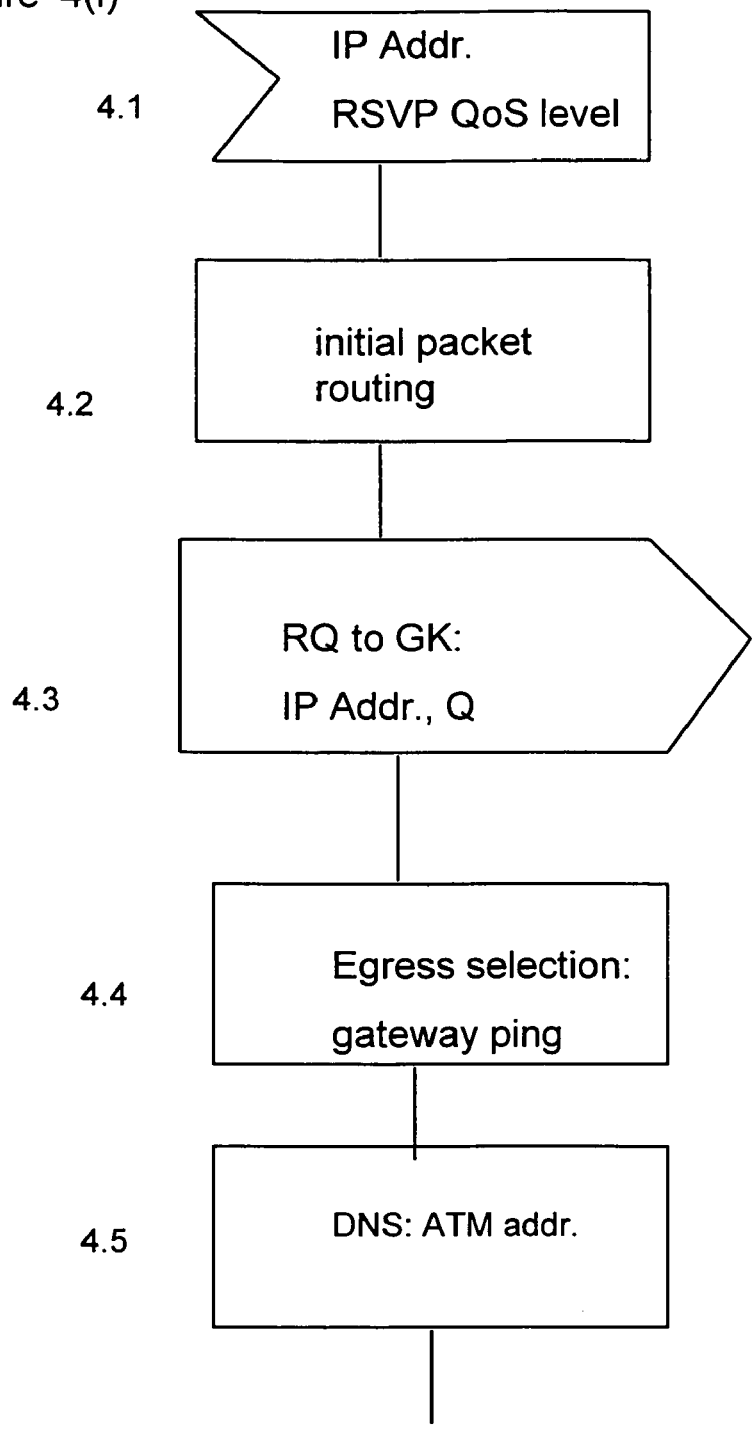
FIG. 4 is a flow diagram showing the illustrating the operation of the network of FIG. 1.
Figure 4:
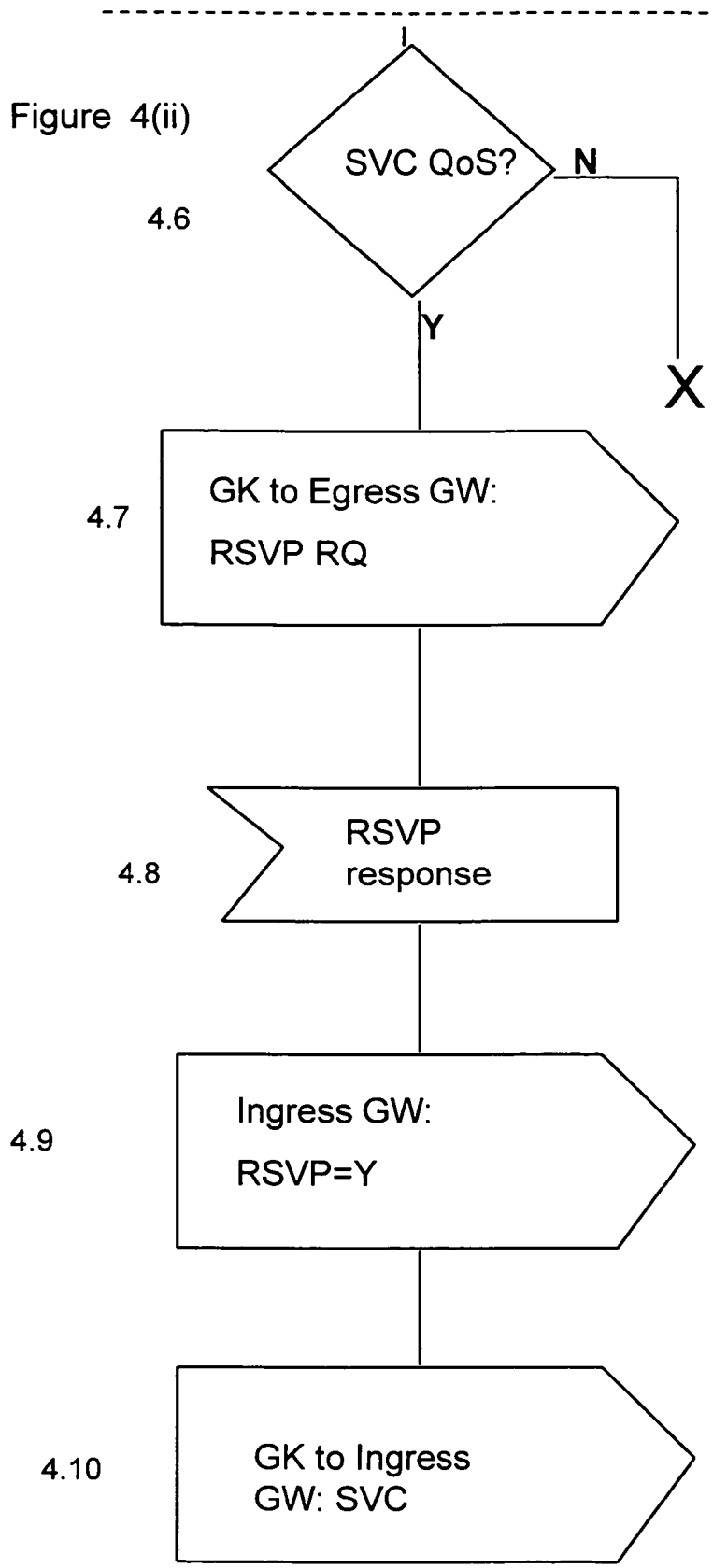

The operation of the system of FIG. 1 is now described with reference to the flow diagram of FIG. 4. Initially, one of the terminals connected to the LAN outputs a stream of IP packets carrying a particular IP Address and also carrying an associated IP QoS level. These are received at the gateway (4.1). These initial packets are passed from the gateway on via the PVC to the internet router, and are routed (4.2) on the internet to the destination address in a conventional fashion. Concurrently, the gateway transmits a request to the gatekeeper (4.3). A configurable algorithm in the gatekeeper ensures that this request is only generated after a predetermined minimum number of packets to the same destination have been received. In this example the required minimum number is three packets in a ten second period. This threshold prevents overloading of the gatekeeper by transient requests. The request sent to the gatekeeper includes the IP address and quality level Q of the stream of packets. The gatekeeper then selects an appropriate egress node on the ATM network (4.4). The process of selection is described in detail below with reference to FIG. 6 This returns (4.5) an ATM address which may be that of the destination itself, if that destination is on the ATM network or, as in this example, is that of a gateway connected to a network on which the destination is located. If there is no ATM address for this IP destination address it will mark this address accordingly in the short term address cache at both the gateway or gatekeeper to avoid another lookup to this IP address. The gatekeeper then determines (4.6) whether a SVC to the ATM address is capable of providing the requested QoS. If not, then the gatekeeper function is terminated, and the IP packets will continue to be passed via the IP router onto the internet. If the required QoS is available on a SVC, then the gatekeeper forwards the RSVP request to an egress gateway (4.7). This is then forwarded to the or each other router between the gateway and the destination address. The response to the RSVP request, which in this example is positive, is then returned via the egress gateway to the gatekeeper (4.8). The gatekeeper returns this positive RSVP response (4.9) via the gateway to the originating terminal. The gateway may then request the gatekeeper to set up the SVC. Alternatively, the gateway may inform the gatekeeper of the required flow rate and a decision whether or not to set up an SVC is then left to the gatekeeper. The gatekeeper then uses proxy signalling into the ATM network to set up the SVC to the destination ATM addresses, and identifies the SVC to the gateway (4.10). Once the SVC identification is received by the gateway, it routes subsequent packets in the datastream out via one of the ATM ports onto the SVC.

Release of the SVC may be initiated by the ingress gateway when the flow of packets from the terminal having the specified destination address stops, or alternatively when an explicit signal is received from the terminal indicating that the transmission to that address had ended. In addition, the gatekeeper is able to release the SVC, for example in order to free capacity for another higher priority data stream, by direct signalling into the network.

Figure 5:
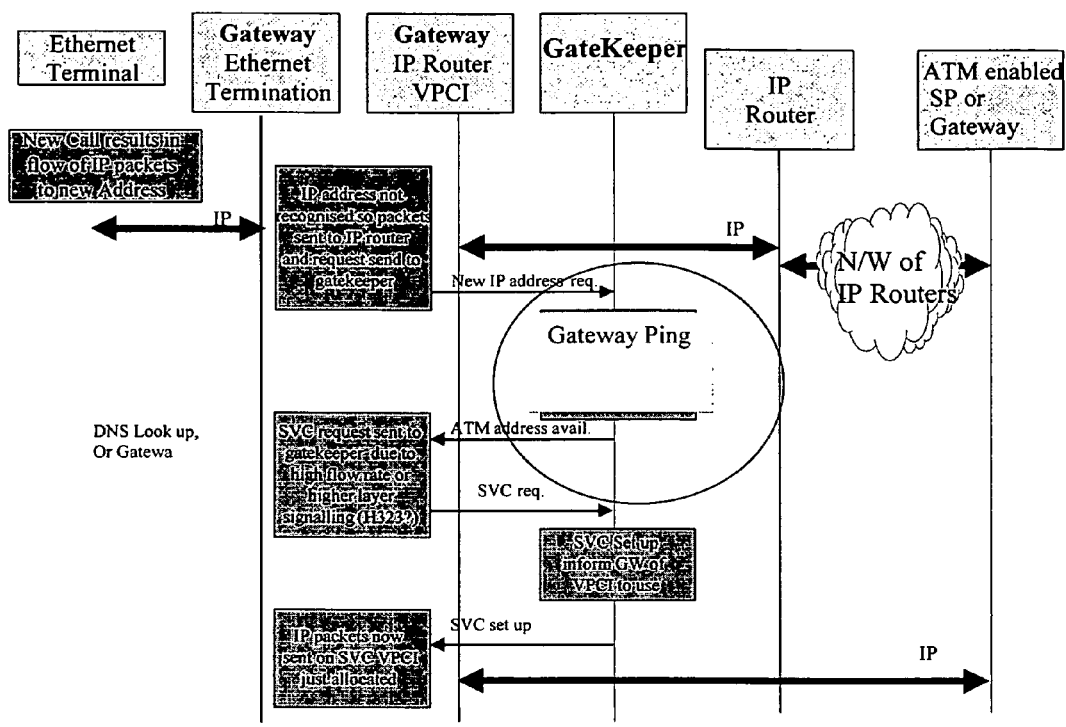
FIG. 5 is a message flow diagram.

FIG. 5 shows the message flows used to implement the process described above.

Figure 6A:
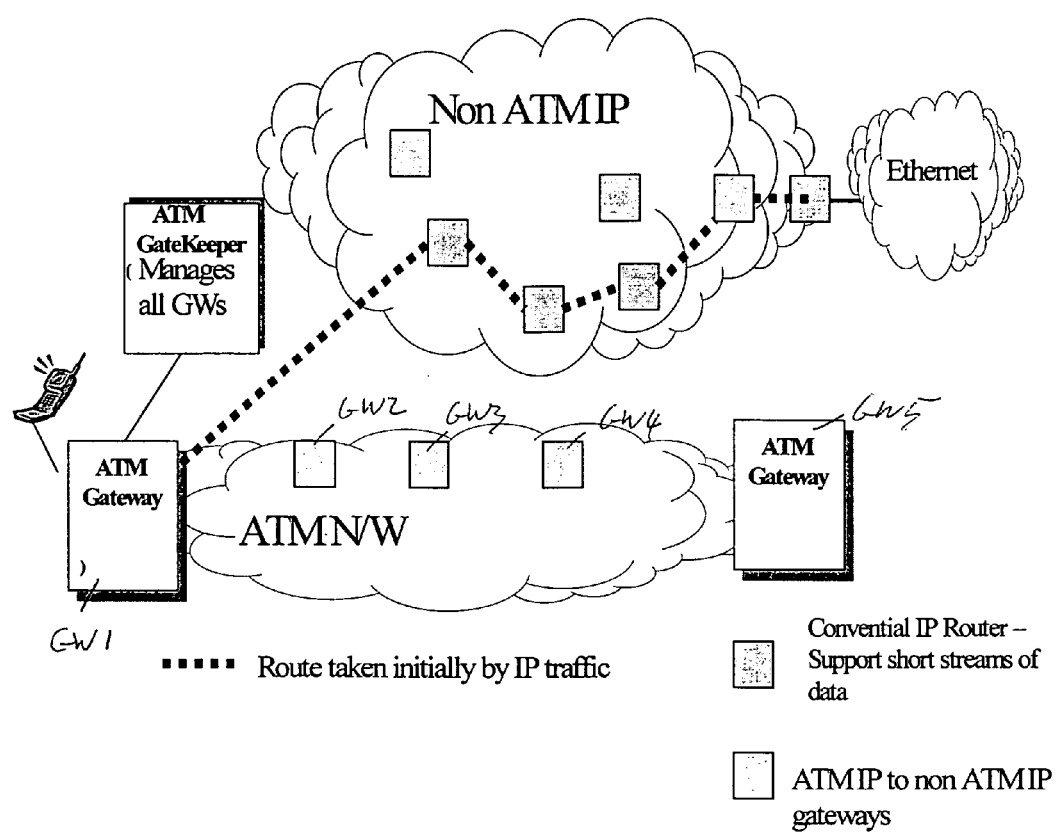
FIGS. 6a to 6e are schematic showing an alternative approach to determining the end point of a switched virtual circuit.
Figure 6B:
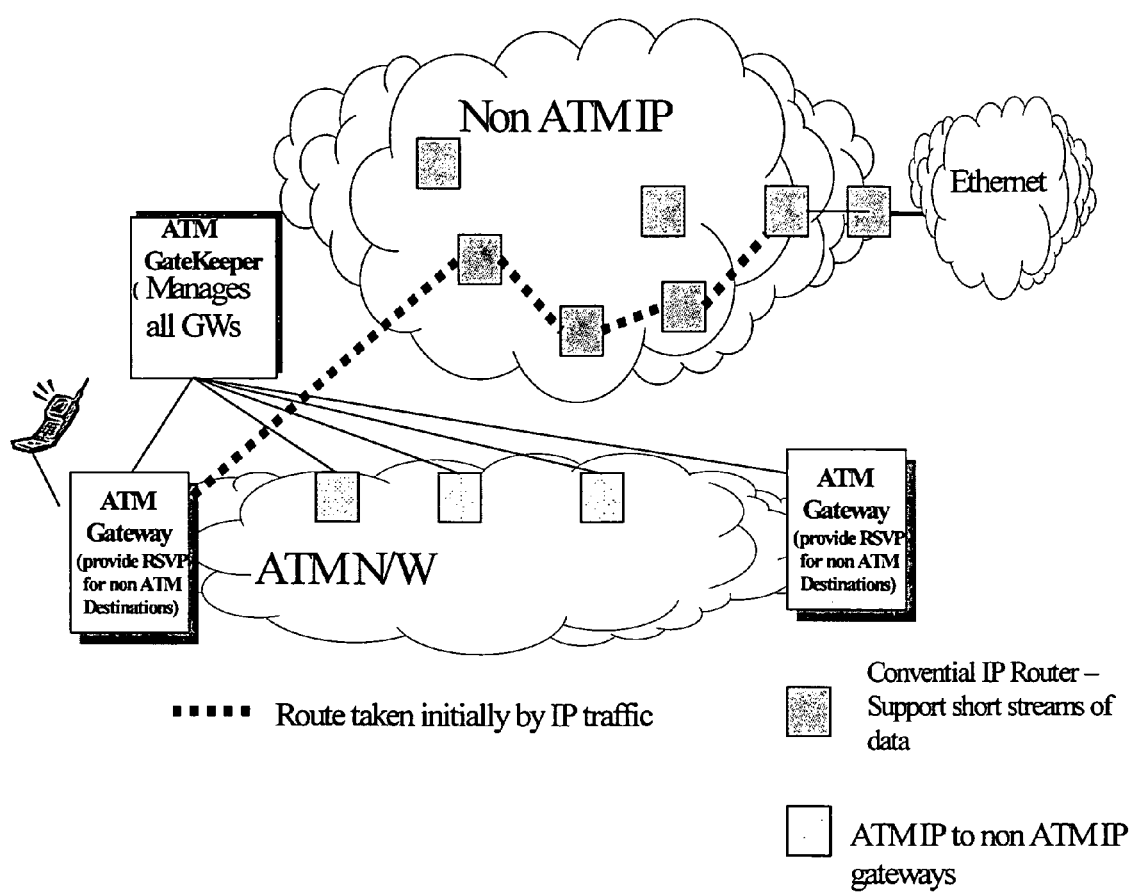
Figure 6C:
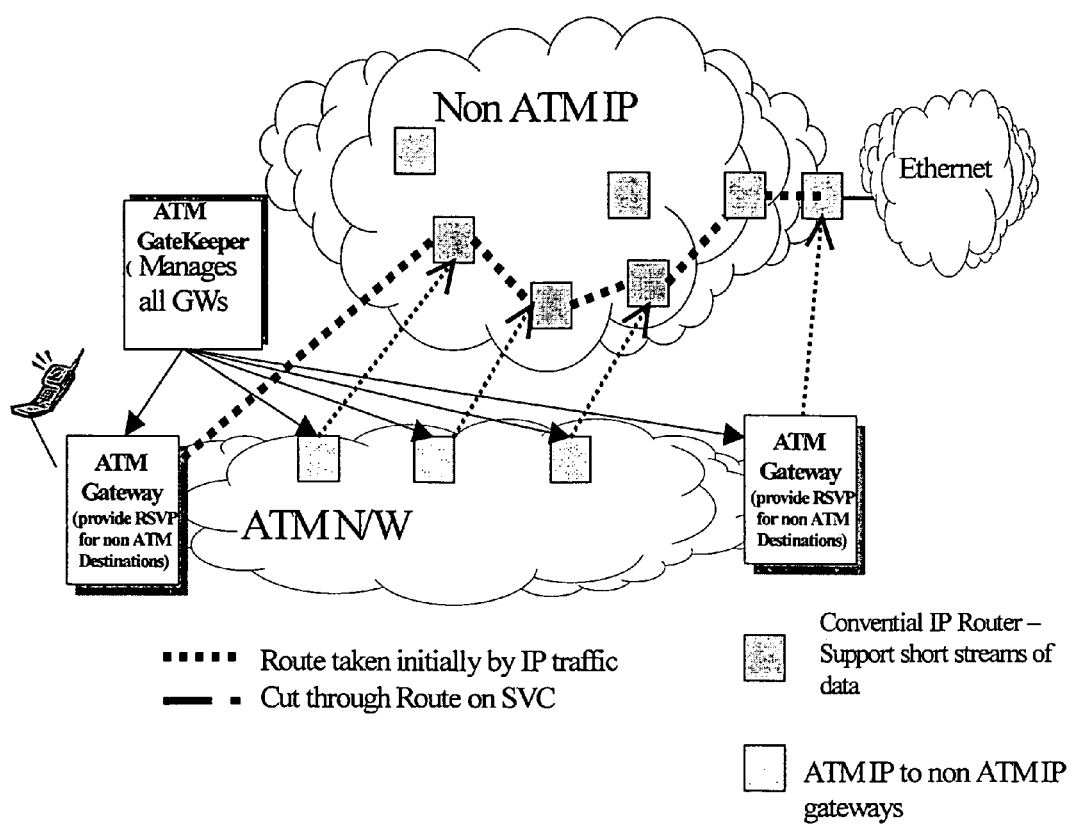
Figure 6D:
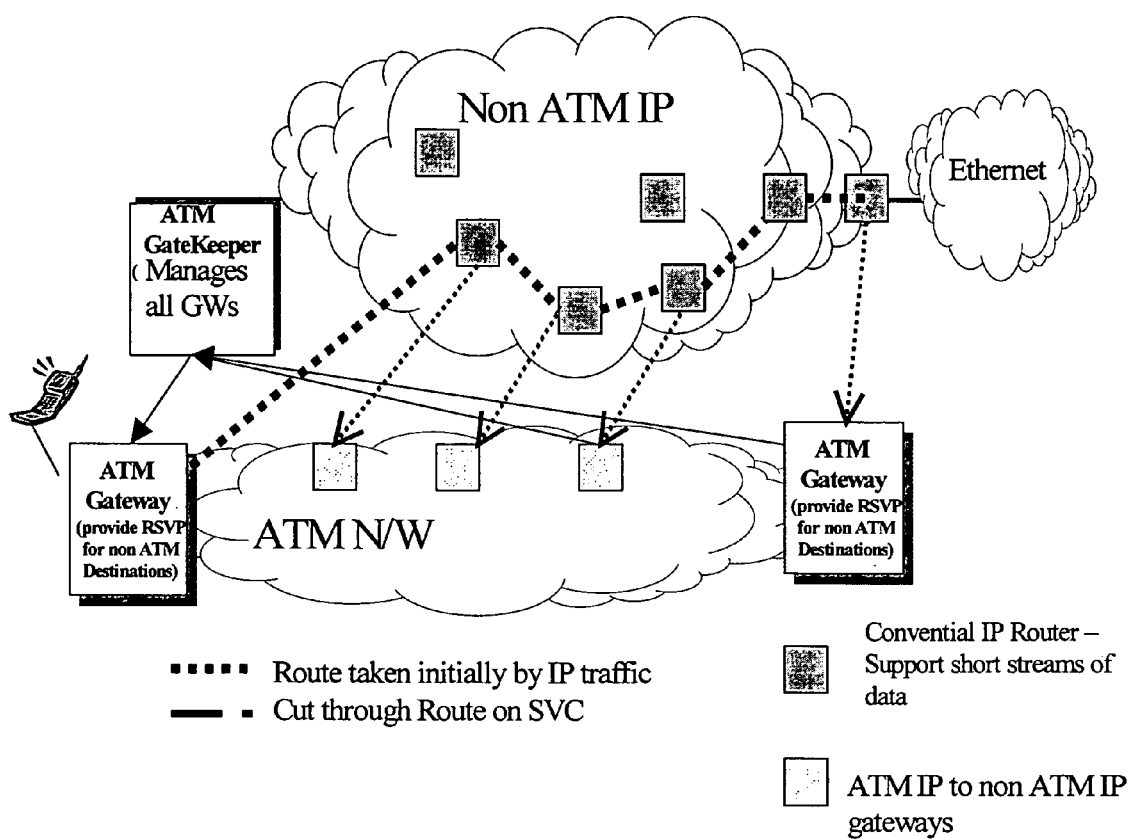
Figure 6E:
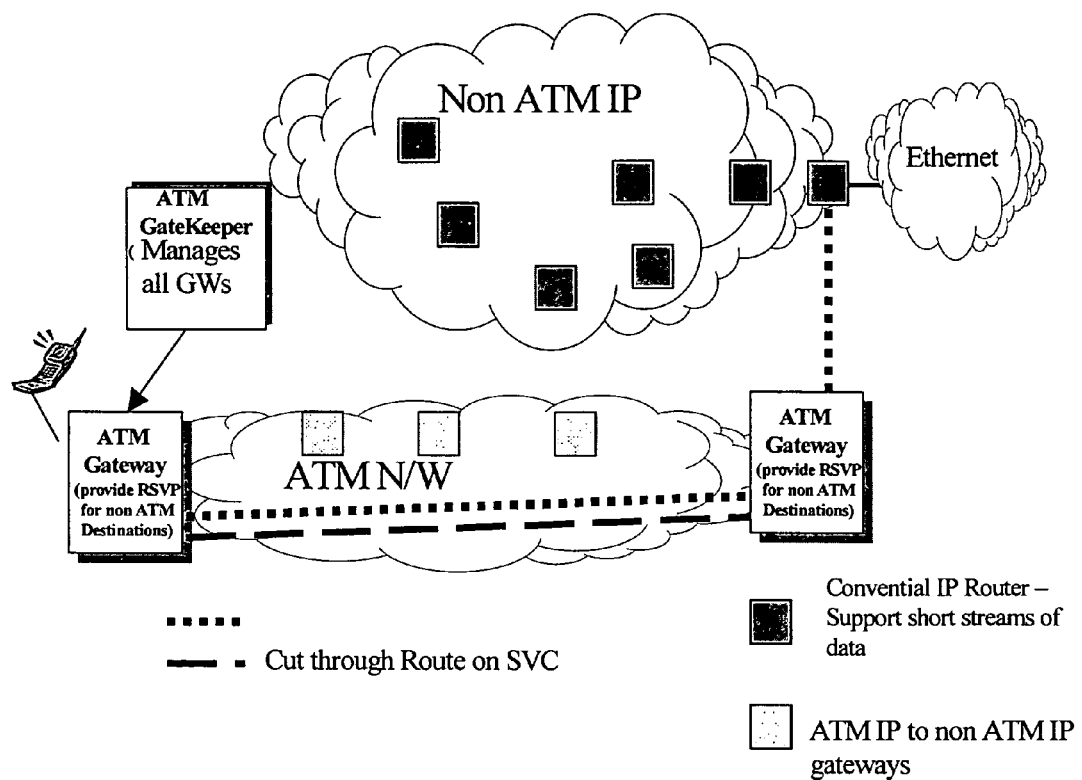

FIGS. 6a to 6e show the preferred scheme for identifying the optimum egress gateway for the switched virtual circuit. As shown in FIG. 6a, packets are initially routed from a gateway into a non-ATM IP network. Subsequently the gateway may detect a sustained flow of traffic to a particular IP address, and/or may receive a request for a certain QoS level for a data flow to that IP address. In response to these conditions, the gateway notifies the gatekeeper. The gatekeeper instructs (FIG. 6b) all of its gateways to transmit a Ping message to the destination IP address. This instruction is accompanied by a threshold time for the response to the Ping message. The gateways receiving this instruction from the gatekeeper may be located on different ATM networks. In response, each gateway transmits a Ping message into the IP network (FIG. 6c). The different gateways receive replies (FIG. 6d) to the Ping message with delays which vary according to factors such as the number of router hops between the gateway and the destination, and the loading of the IP network between the gateway and the destination. In this example, two of the gateways have response times for the replies which fall below the threshold specified by the gatekeeper. These two gateways, referenced GW4, GW5 in the Figure, return a signal to the gatekeeper indicating the delay in their respective responses to the Ping message. The gatekeeper selects the gateway with the lowest delay, GW5 in this example, and sets up a switched virtual circuit from the initial gateway, GW4, to GW5. In this way a significant increase in the level and reliability of the QoS for the data stream is realised, despite the fact that the destination is an IP address that, in this example, is not directly connected to any ATM network.

Figure 7A:
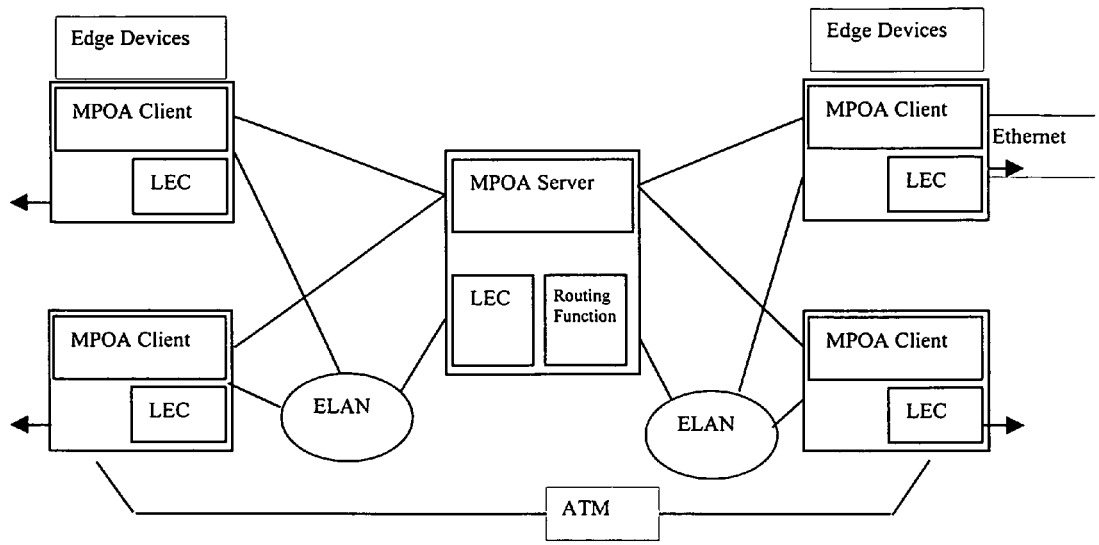
FIGS. 7a and 7b are schematics showing a prior art system.
Figure 7B:
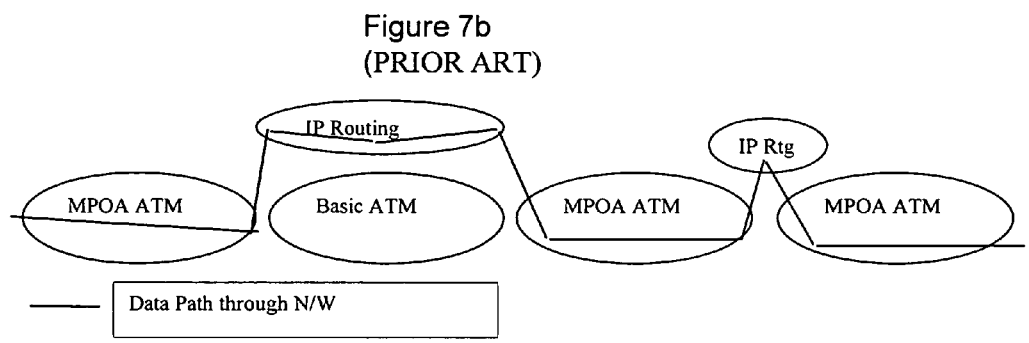

FIGS. 7a and 7b illustrate a prior art system using the MPOA (multi protocol over ATM) architecture. This system includes an MPOA server that corresponds in some, but not all, respects to the gatekeeper of the present and a number of MPOA clients that similarly correspond in some respects to the gatekeepers of the present invention. The system uses a number of ATM switches which implement the ATM forum LANE (local area network emulation) protocol. The ATM server contains a routing function which controls the ATM switches both to route individual packets and also to establish, where appropriate, switched virtual circuits between selected MPOA clients. The extent of any virtual circuit is limted to an individual MPOA network. As shown in FIG. 7b, at the boundary between different MPOA networks, or when a conventional non-MPOA ATM network is reached, there is a delay associated with a return to the IP routing layer.

Figure 8:
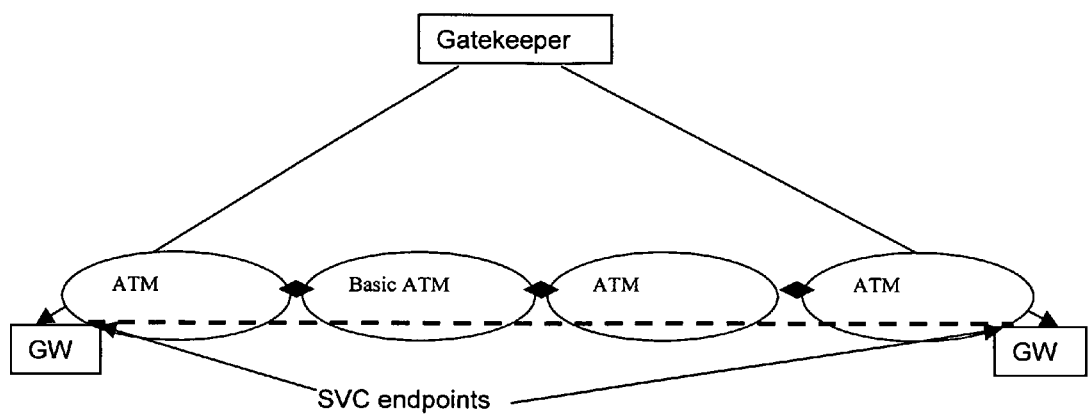
FIG. 8 illustrates a system embodying the present invention and spanning different ATM networks.

FIG. 8 illustrates an embodiment of the invention in which an SVC is established that spans a number of different ATM networks. The only requiremens for this to be possible are that there should be gateways on the ingress and egress networks, and that standard ATM circuit set-up protocols should be supported across the boundaries of the different networks.

Although the examples described above relate to IP traffic and ATM networks, the invention is applicable to other types of networks including, for example X.25 networks or frame relay networks.

What is claimed is:

1. A method of operating a communications system comprising a packet-switched network, a circuit-switched network, a plurality of gateways connecting the circuit-switched network to the packet-switched network, said method comprising:
    a) receiving packet traffic at one of the gateways;
    b) establishing in the circuit-switched network a circuit from said one gateway to a node on the circuit-switched network;
    c) outputting the said packet traffic from said one gateway onto the circuit of the circuit-switched network;
    d) concurrent with the outputting of said packet traffic in step (c), outputting, from a plurality of gateways, polling messages addressed to the destination address of the packet traffic;
    e) receiving at the gateways replies from the destination address;
    f) determining respective delays for the replies at different gateways;
    g) selecting one of the gateways depending on the respective delay times; and
    h) establishing a virtual circuit to the gateway selected in step (g).

2. A method as in claim 1, in which the circuit-switched network includes a plurality of independently controlled networks and different ones of the plurality of gateways are connected to different respective ones of the plurality of networks.

3. A method as in claim 1, in which at least one of the gateways communicate a respective delay time to a control node and the step of selecting one of the gateways is carried out by the control node.

4. A method as in claim 3, in which only each gateway having a respective delay value less than a threshold value communicates its delay value to the control node.

5. A method as in claim 1 in which the packets are Internet Protocol (IP) packets.

6. A method as in claim 1 in which the circuit-switched network is an ATM (asynchronous transfer mode) network.

7. A control node for use in a method as in claim 1, the control node including a control processor and a signalling interface, which signalling interface, in use, communicates signals with a plurality of gateways in a circuit-switched network, the control processor being arranged to carry out the following steps in sequence:
    a) communicating instructions to the plurality of gateways to transmit polling messages to a destination address in a circuit-switched network connected to the gateways;
    b) receiving from the plurality of gateways indications of respective delays in responses to the polling messages; and
    c) selecting, depending on the respective delays, one of the gateways as the end-point of a virtual circuit.

8. A gateway for use in a method as in claim 1, the gateway including a first interface for connection to a packet-switched network, a second interface for connection to a circuit-switched network, and a control processor including a control interface arranged to communicate control signals with a control node, the control processor being arranged to carry out the following steps in sequence:
    a) in response to a control message from the control mode transmitting a polling message to a destination address in the circuit-switched network;
    b) receiving a reply from the destination address and determining the delay of the reply; and
    c) communicating the reply to the control node.

9. A communications network including a control node as in claim 7 and a gateway including a first interface for connection to a packet-switched network, a second interface for connection to a circuit-switched network, and a control processor including a control interface arranged to communicate control signals with a control node, the control processor being arranged to carry out the following steps in sequence:
    a) in response to a control message form the control mode transmitting a polling message to a destination address in the circuit-switched network;
    b) receiving a reply from the destination address and determining the delay of the reply; and
    c) communicating the reply to the control node.

10. A method as in claim 1 further comprising:
    monitoring the level of traffic over the circuit established in step (b) and carrying out the selection step (g) and the establishing step (h) only when traffic above a certain level is detected on that circuit.

* * * * *